(12) United States Patent
Kim et al.

(10) Patent No.: US 7,600,929 B2
(45) Date of Patent: Oct. 13, 2009

(54) METHOD AND APPARATUS FOR CONTROLLING PANNING/TILTING MOTOR OF MONITORING CAMERA

(75) Inventors: Hak-je Kim, Suwon-si (KR); Hye-young Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 11/340,596

(22) Filed: Jan. 27, 2006

(65) Prior Publication Data
US 2006/0193626 A1 Aug. 31, 2006

(30) Foreign Application Priority Data
Feb. 28, 2005 (KR) .................. 10-2005-0016795

(51) Int. Cl.
*G03B 17/00* (2006.01)
(52) U.S. Cl. .................. 396/427; 396/439; 348/143
(58) Field of Classification Search ........... 396/427, 396/439; 352/69; 348/143
See application file for complete search history.

(56) References Cited

U.S. PATENT DOCUMENTS

| | | | |
|---|---|---|---|
| 5,604,412 A * | 2/1997 | Okada et al. | 318/400.32 |
| 6,392,693 B1 * | 5/2002 | Wakiyama et al. | 348/143 |
| 6,922,030 B2 * | 7/2005 | Chou | 318/400.22 |
| 2006/0098092 A1 * | 5/2006 | Park | 348/143 |

FOREIGN PATENT DOCUMENTS

| | | |
|---|---|---|
| JP | 04-248794 | 9/1992 |
| JP | 06-086592 | 3/1994 |
| JP | 09-018747 | 1/1997 |
| JP | 10-111304 | 4/1998 |
| JP | 11-341335 | 12/1999 |

* cited by examiner

Primary Examiner—Christopher E Mahoney
Assistant Examiner—Autumn Parker
(74) Attorney, Agent, or Firm—Roylance, Abrams, Berdo & Goodman, L.L.P.

(57) ABSTRACT

A method and apparatus for controlling a panning/tilting motor of a monitoring camera is disclosed. The position or speed of the motor is controlled based on the output of a hall sensor built in the motor without any position detection device such as encoder, so that the closed loop control of the panning/tilting motor is accurately performed, and the position coordinate of the panning/tilting motor is not distorted when the motor is out of step.

18 Claims, 8 Drawing Sheets

METHOD AND APPARATUS FOR CONTROLLING PANNING/TILTING MOTOR OF MONITORING CAMERA

This application claims the benefit under 35 U.S.C. § 119 (a) from Korean Patent Application No. 2005-16795, filed on Feb. 28, 2005, in the Korean Intellectual Property Office, the disclosure of which is incorporated herein by reference.

BACKGROUND OF THE INVENTION

1. Field of the Invention

The present invention relates to a method for controlling a panning/tilting motor of a monitoring camera. More particularly, the present invention relates to a method for controlling a panning/tilting motor in a closed loop using a brushless DC (BLDC) motor without employing a position detection device such as an encoder.

2. Description of the Related Art

A speed dome camera which is an example of a closed-circuit TV (hereinafter referred to as "CCTV") monitoring system is a camera that detects motion in a monitoring area and moves in horizontal and vertical directions through a panning/tilting function. The camera is mounted in a hemispheric or spherical housing.

FIG. 1 is a schematic view of a conventional control system for a monitoring camera to control the panning/tilting function, in which the control system includes a panning/tilting monitoring camera 12, a control panel 14 (e.g., a controller) for transmitting a panning/tilting control command, and an image output 16 for displaying an image output from the camera.

The panning function is to rotate the camera in a 360 degree panning direction on a horizontal plane by a panning motor, and the tilting function is to rotate the camera in a 90 degree tilting direction on a vertical plane by a tilting motor. The monitoring area can be expanded by using the panning/tilting function.

The panning motor and the tilting motor employ a stepping motor which drives at variable speed. The panning/tilting direction and speed of the motor may be controlled according to a step (i.e., drive pulse) output from the control panel 14 of the speed dome camera.

Such a speed dome camera includes a panning sensor for initializing the position of the panning motor and a tilting sensor for initializing the position of the tilting motor. When the power is turned on, the panning motor moves from an actual position to a panning sensor position, and the tilting motor moves from an actual position to a tilting sensor position. The counter of the drive pulse is initialized after the power is turned on to allow the positions of the panning motor and tilting motor to be determined through the counting of the output drive pulse. Hence, the speed dome camera can be adaptively driven.

As described above, the position control unit of the panning/tilting camera includes the panning motor for allowing the camera to move in the panning direction, the tilting motor for allowing the camera to move in the tilting direction, and a control circuit for controlling the panning motor and the tilting motor. Position control is classified into open loop control and closed loop control according to the control mode of the motor. FIG. 2A shows a conventional open loop control system. FIG. 2B shows a conventional closed loop control system.

The open loop control system of FIG. 2A includes a stepping motor 26 having no feedback signal, a microcomputer 22 for controlling moving speed and moving direction of the motor, and a driver 24 for receiving an output signal from the microcomputer 22 and generating a motor drive current to drive the stepping motor 26 and having a pulse generator and a driver integrated circuit(IC). Such an open loop control system controls the speed of the motor according to frequency variation of a clock signal CLK provided to the driver 24 from the microcomputer 22, and controls the moving direction of the motor through the control of the high/low state of a direction signal DIRECTION provided to the driver 24 from the microcomputer 22.

Specifically, the microcomputer 22 varies the clock signal CLK and the direction signal DIRECTION to control the motor. Whenever the driver 24 outputs the pulse to the motor, the microcomputer 22 counts the number of the pulses to determine the position of the motor.

A major feature of the stepping motor is that the motor rotates corresponding to the pulse power. Since an angle of rotation is varied in proportion to the number of the pulses, and the rotation speed is varied in proportion to an input frequency, the stepping motor can control the operation of the motor without performing the feedback.

The closed loop control system of FIG. 2B includes a DC/BLDC/AC motor 36 with an encoder, a microcomputer 32 for creating a pulse width modulated (PWM) output to drive the motor, and a driver 34 for applying a motor drive current to the DC/BLDC/AC motor 36 according to an output signal of the microcomputer 32.

With the closed loop control system, the motor 36 is provided with the encoder to control the position of the motor and thereby improve position accuracy. More specifically, three encoder output signals corresponding to an amount of rotation are fed back from the encoder to the microcomputer 32. The microcomputer 32 outputs six PWM signals to the driver 34, and the driver 34 passes six PWM signals through an inverter circuit (not shown) to apply 3-phase PWM voltage to the DC/BLDC/AC motor 36. A sine-wave current having a phase difference of 120 degrees is applied to the DC/BLDC/AC motor 36 by the 3-phase PWM voltage to rotate the motor. In addition, whenever the motor 36 rotates, the output of the encoder is fed back to the microcomputer 32. The precision of the motor position control is determined by resolution of the encoder.

Alternatively, the conventional DC motor may employ a discrete closed loop control system using an output of a hall sensor only to control the position of the motor, which is not shown.

Terminals of a microcomputer are connected to six inputs of an inverter circuit, and the inverter circuit outputs three signals (i.e., A-phase, B-phase, and C-phase signals) to the motor through a combination of six high/low-state signals to rotate the motor. When the motor rotates, an output voltage of the hall sensor is fed back to the microcomputer to determine, the position of the motor.

The conventional control systems described above have the following drawbacks.

The drawback of the open loop control system of FIG. 2A using the stepping motor shall now be described. First, since there is no feedback signal corresponding to the position of the motor, position information is wrong when the motor is out of step. Second, a torque property is lowered in comparison to the DC motor. Specifically, since the monitoring camera has to continuously operate for the purpose of the product and is mainly installed outdoors, the motor is prone to stepping out due to vibration, wind or the like. Hence, the open loop control system using the stepping motor of FIG. 2A in the monitoring camera has the cost advantage, but lacks a desired level of position accuracy.

The closed loop control system of FIG. 2B using the DC/AD/BLDC motor has an advantage in that the accurate position of the motor can be determined through the feedback signal; however, it is limited to the utilization of an additional encoder to control the position. In addition, since the accuracy of the position control is influenced by resolution of the encoder, an expensive encoder of a high resolution is needed for more accurate position control.

Also, in the above-described discrete closed loop control system that controls the position of the motor based on the output of the hall sensor of the DC/BLDC motor, since the position accuracy becomes an electronic angle of 60 degrees, it is not employed in a system that requires an accurate position control such as a monitoring camera. This is because an actual rotational angle of the motor is determined by multiplying the electronic angle by the number of poles of the motor.

SUMMARY OF THE INVENTION

The present invention has been developed in order to solve the above drawbacks and other problems associated with the conventional arrangement. An aspect of the present invention is to provide a method for controlling a panning/tilting motor of a monitoring camera in which the position of the motor is accurately controlled by a voltage of a hall sensor of a BLDC motor itself, without employing a position detection device such as an encoder.

In order to achieve the above-described aspects of the present invention, there is provided an apparatus for controlling a panning/tilting motor of a monitoring camera, comprising a control unit for controlling a position or speed of the panning/tilting motor using an output of a hall sensor provided in the motor without any separate position detection device such as an encoder.

The apparatus further comprises a motor angle calculation unit for calculating an actual angle of the motor based on data outputted from the hall sensor, and a panning/tilting position coordinate calculation unit for calculating an actual position of the panning/tilting motor based on the angle of the motor calculated by the motor angle calculation unit.

The motor angle calculation unit receives an output waveform of a hall amplifier which modulates 3-phase output voltages of respective motor hall sensors of the panning/tilting motor with the predetermined and substantially the same amplitude and offset through its A/D (Analog to Digital conversion) port when the panning/tilting motor rotates, and scans the voltages for a specified period of time to calculate the actual angle of the motor for each scanning operation.

The actual position of the panning/tilting motor is calculated by multiplying the counted value of the electronic revolution of the motor by 360 degrees and then adding the actual angle of the motor to the resultant value.

The electronic revolution of the motor COUNTER (elec_rev) is calculated such that, if the actual angle is larger than the previous angle, the direction of the motor is determined as clockwise, and the electronic revolution of the panning/tilting motor COUNTER(elec_rev) is increased by 1. When the value of the increased electronic revolution COUNTER(elec_rev) is larger than the value obtained by multiplying the number of poles of the motor by a gear ratio, the value of the increased electronic revolution COUNTER(elec_rev) is substituted by "elec_rev−(the number of poles of the motor*gear ratio)". The electronic revolution of the motor COUNTER(elec_rev) is calculated such that, if the actual angle is smaller than the previous angle, the direction of the motor is determined as counterclockwise, and the electronic revolution of the panning/tilting motor COUNTER(elec_rev) is decreased by 1. When the value of the decreased electronic revolution COUNTER(elec_rev) is larger than 0, the value of the electronic revolution COUNTER(elec_rev) is substituted by elec_rev=elec_rev+(the number of poles of the motor*gear ratio).

Preferably, the apparatus further comprises a proportional integral (PI) position control unit for controlling position or speed so that a predetermined target position coordinate of the panning/tilting motor is compared with the actual position coordinate of the panning/tilting motor calculated by the position coordinate calculation unit and, if the target position coordinate of the of the panning/tilting motor is different from the actual position coordinate, the panning/tilting motor moves as far as the difference to reach the target position.

In order to achieve the above-described aspects of the present invention, there is provided an apparatus for controlling a panning/tilting motor of a monitoring camera, comprising: a BLDC motor having a hall sensor; a hall amplifier for amplitude modulating an amplitude and offset of an output voltage of the hall sensor substantially equally; a control unit outputting a PWM pulse to drive the BLDC motor and receiving the voltage of the hall sensor outputted from the hall amplifier to control a position or speed of the panning/tilting motor; and a 3-phase motor driver for modulating the PWM output from the control unit to apply a 3-phase sine-wave current to the BLDC motor, in which the position or speed of the panning/tilting motor is controlled by only the output of the hall sensor provided in the motor.

The control unit comprises a motor angle calculation unit for calculating an actual angle of the motor based on data outputted from the hall sensor, and a panning/tilting position coordinate calculation unit for calculating an actual position of the panning/tilting motor based on the angle of the motor calculated by the motor angle calculation unit.

Preferably, the motor angle calculation unit receives an output waveform from the hall amplifier at an A/D port, and scans the voltage for a specified period of time, so that the motor angle calculation unit calculates the actual angle of the motor for each scanning operation.

The actual position of the panning/tilting motor is calculated by multiplying the counted value of the electronic revolution of the motor by 360 degrees and then adding the actual angle of the motor to the resultant value.

Preferably, the electronic revolution of the motor COUNTER(elec_rev) is calculated so that, if the actual angle is larger than the previous angle, the direction of the motor is determined as clockwise, and the electronic revolution of the panning/tilting motor COUNTER(elec_rev) is increased by 1. If the value of the increased electronic revolution COUNTER(elec_rev) is larger than the value which is obtained by multiplying the number of poles of the motor by a gear ratio, the value of the increased electronic revolution COUNTER (elec_rev) is substituted by elec_rev=elec_rev−(the number of poles of the motor*gear ratio). The electronic revolution of the motor COUNTER(elec_rev) is calculated so that if the actual angle is smaller than the previous angle, the direction of the motor is determined as counterclockwise, and the electronic revolution of the panning/tilting motor COUNTER (elec_rev) is decreased by 1. If the value of the decreased electronic revolution COUNTER(elec_rev) is larger than 0, the value of the electronic revolution COUNTER(elec_rev) is substituted by elec_rev=elec_rev+(the number of poles of the motor*gear ratio).

Preferably, the control unit further comprises a PI position control unit for controlling the position or speed so that a predetermined target position coordinate of the panning/tilting motor is compared with the actual position coordinate of the panning/tilting motor calculated by the position coordinate calculation unit and, if the target position coordinate of the of the panning/tilting motor is different from the actual position coordinate, the panning/tilting motor moves as far as the difference to reach the target position.

In order to achieve the above-described aspects of the present invention, there is provided a method for controlling a panning/tilting motor of a monitoring camera, comprising the steps of: (1) calculating an actual angle of the motor based on an output of a hall sensor built in the motor; (2) calculating an actual position of the panning/tilting motor based on the actual angle of the motor calculated in the angle calculation step (1); and (3) calculating a difference between a predetermined target position coordinate of the panning/tilting motor and the actual position coordinate of the panning/tilting motor by comparing them with each other and, if the target position coordinate of the of the panning/tilting motor is different from the actual position coordinate, controlling the position or speed of the panning/tilting motor so that the motor moves as far as the difference to reach the target position.

The actual position of the panning/tilting motor is calculated by multiplying the counted value of the electronic revolution of the motor by 360 degrees and then adding the actual angle of the motor to the resultant value.

The electronic revolution of the motor COUNTER (elec_rev) is calculated such that, if the actual angle is larger than the previous angle, the direction of the motor is determined as clockwise, and the electronic revolution of the panning/tilting motor COUNTER(elec_rev) is increased by 1. If the value of the increased electronic revolution COUNTER (elec_rev) is larger than the value which is obtained by multiplying the number of poles of the motor by a gear ratio, the value of the increased electronic revolution COUNTER (elec_rev) is substituted by elec_rev=elec_rev−(the number of poles of the motor*gear ratio). The electronic revolution of the motor COUNTER(elec_rev) is calculated so that, if the actual angle is smaller than the previous angle, the direction of the motor is determined as counterclockwise, and the electronic revolution of the panning/tilting motor COUNTER (elec_rev) is decreased by 1. When the value of the decreased electronic revolution COUNTER(elec_rev) is larger than 0, the value of the electronic revolution COUNTER(elec_rev) is substituted by elec_rev=elec_rev+(the number of poles of the motor*gear ratio).

The step of calculating the actual angle of the motor comprises the step of amplitude-modulating an output voltage of the hall sensor built in the motor with the substantially the same amplitude and offset, receiving and scanning the signal amplitude-modulated in the amplitude modulation step as a digital signal for a specified period of time and calculating the actual angle of the motor for each scanning operation.

Preferably, the step of calculating the actual angle of the motor comprises the steps of receiving the amplitude-modulated 3-phase signal as a digital signal to divide the signal into a desired number of sections represented by at least sections 1, 2, 3, 4, 5 and 6 according to the size order of values (a>b>c) scanned for a specified period of time where a, b and c represent respective phases of the 3-phse signal; calculating $X=(a-b)$, $Y=(b-c)$ and ratio=max[X, Y]/min[X,Y]) based on a maximum value (a), an intermediate value (b), and a minimum value (c) in each section; determining whether an angle of the motor is increased or decreased; if the angle is decreased, calculating a ratio value for each section of which the angle is decreased in the section (n), and preparing a first table based on the ratio value for each section, while if the angle is increased, calculating a ratio value for each section of which the angle is increased in the section (n), and preparing a second table based on the ratio value for each section; determining whether each section is a section 2, 4 or 6; and if each section is the section 2, 4 or 6 in the step of determining the section, determining whether the value X is smaller than the value Y, and if the value X is smaller than the value Y, adding each offset value to a value of table address having a most approximate value to the ratio with reference to the first table to calculate an electronic angle of the motor.

Preferably, the method further comprises, if each section is the section 2, 4 or 6 in the step of determining the section and if the value X is lager than the value Y, adding each offset value to a value of a table address having the most approximate value to the ratio value with reference to the second table to calculate an electronic angle of the motor.

Preferably, the method further comprises, if each section is not the section 2, 4 or 6 in the step of determining the section, determining whether the value X is smaller than the value Y, and if the value X is smaller than the value Y, adding each offset value to a value of a table address having the most approximate value to the ratio value with reference to the second table to calculate an electronic angle of the motor.

Preferably, the method further comprises the step of, if each section is not the section 2, 4 or 6 in the step of determining the section and if the value X is smaller than the value Y, adding each offset value to a value of a table address having the most approximate value to the ratio value with reference to the second table to calculate an electronic angle of the motor.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
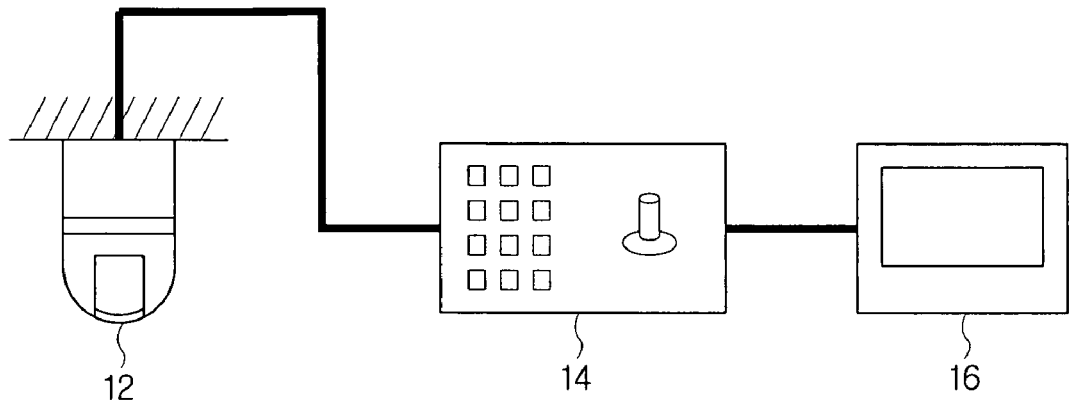
FIG. 1 is a schematic view of a conventional control system of a monitoring camera capable of controlling a panning/tilting motor.
Figure 2A:
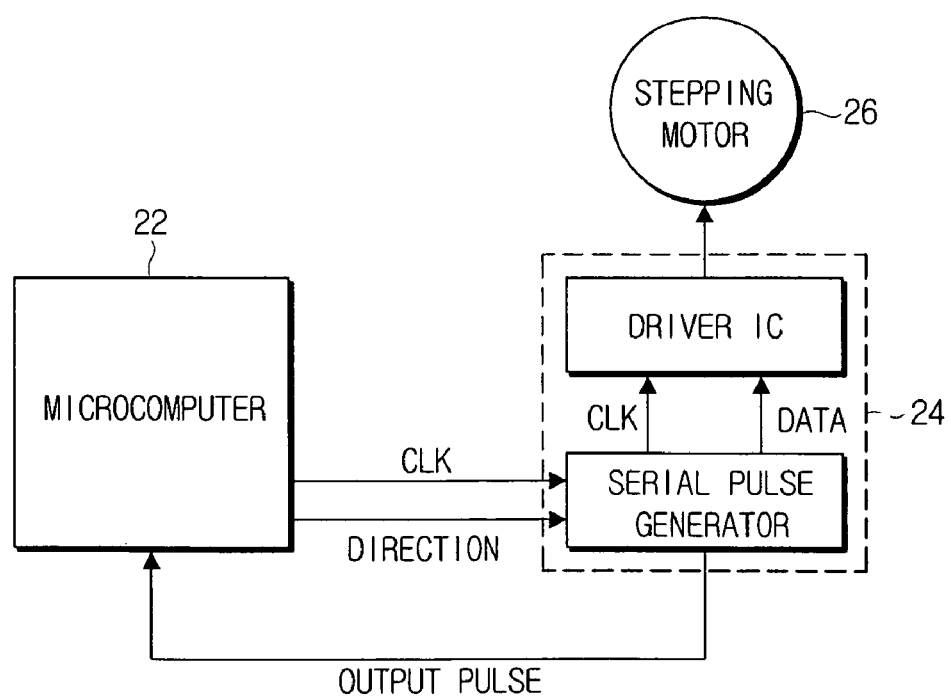
FIG. 2A is a view of a conventional open loop control system.
Figure 2B:
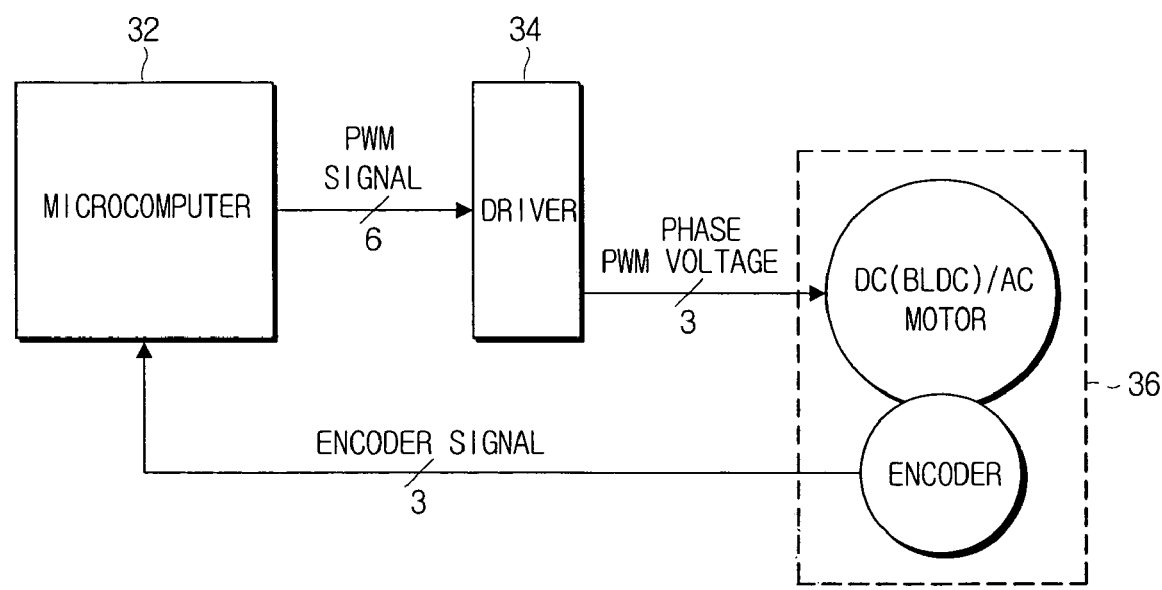
FIG. 2B is a view of a conventional close loop control system.

Certain embodiments of the present invention will be described in greater detail with reference to the accompanying drawings.

In the following description, same drawing reference numerals are used for the same elements throughout the drawings. Well-known functions or constructions are not described in detail since they would obscure the invention in unnecessary detail.

Figure 3:
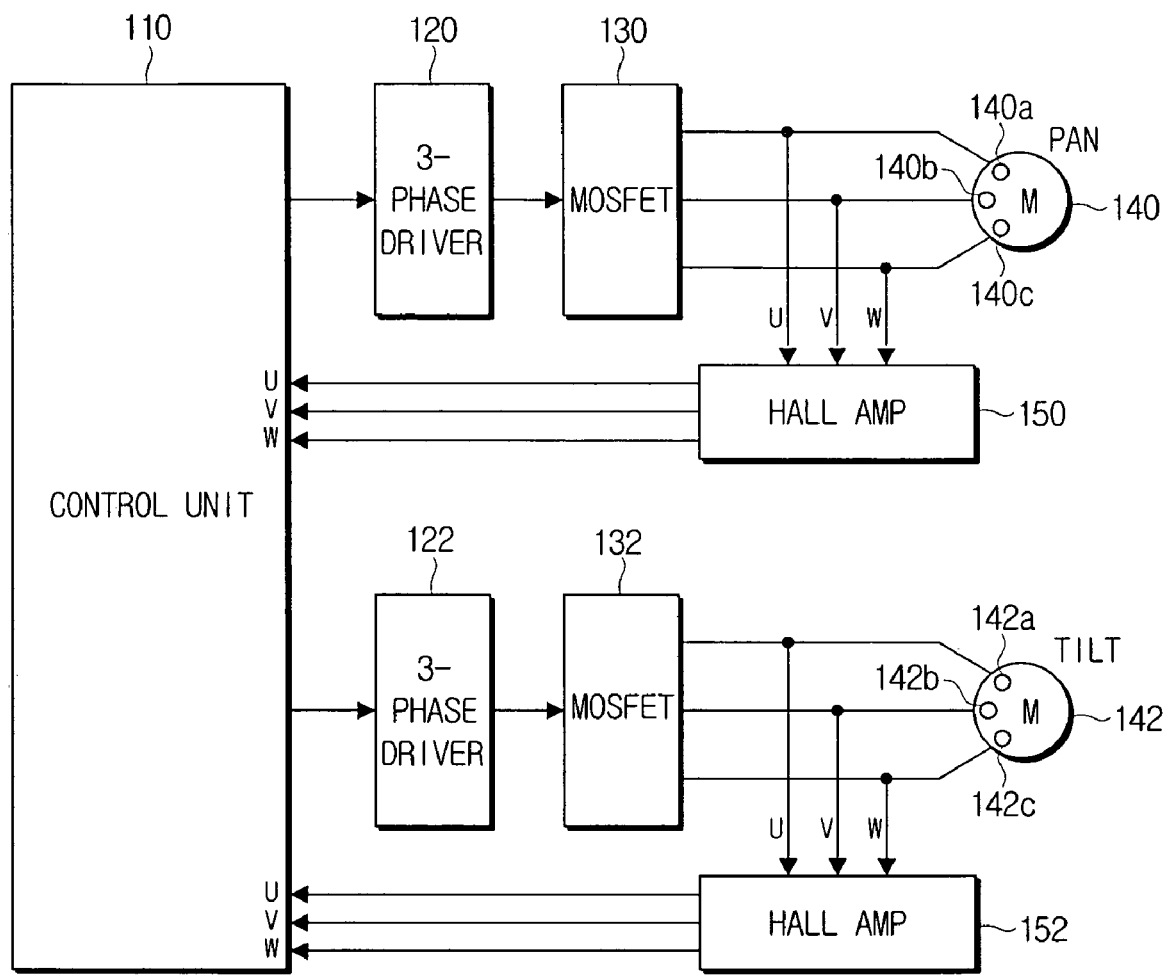
FIG. 3 is a block diagram of a panning/tilting motor control system using a BLDC motor according to an exemplary embodiment of the present invention.

FIG. 3 is a block diagram of a panning/tilting motor control system using a BLDC motor according to the present invention. As shown in FIG. 3, the panning/tilting motor control system includes BLDC motors 140 and 142 each having three hall sensors (e.g., 140a, 140b, 140c and 142a, 142b, 142c (respectively), a control unit 110 for outputting six PWM pulses to drive the BLDC motors 140 and 142 and for receiving the voltages of the hall sensors 140a, 140b, 140c, and 142a, 142b, 142c, respectively, of the BLDC motors 140 and 142 to execute the position control operation, 3-phase motor drivers 120 and 122 for modulating the six PWM outputs outputted from the control unit 110 to apply a 3-phase sine wave to the BLDC motors 140 and 142, MOSFETs 130 and 132 each having 6 power MOSFETs for receiving the 3-phase sine wave from the 3-phase motor drivers 120 and 122, respectively, and functioning as the switching device to turn on/off the 3-phase BLDC motors 140 and 142, and hall amplifiers 150 and 152 for modulating the output voltages of the 3-phase hall sensors 140a-140c and 142a-142c in the motors 140 and 142, respectively, to a value that can be calculated in the control unit 110 by amplitude-modulating the output voltage of the 3-phase hall sensor within the same amplitude and offset.

Figure 4:
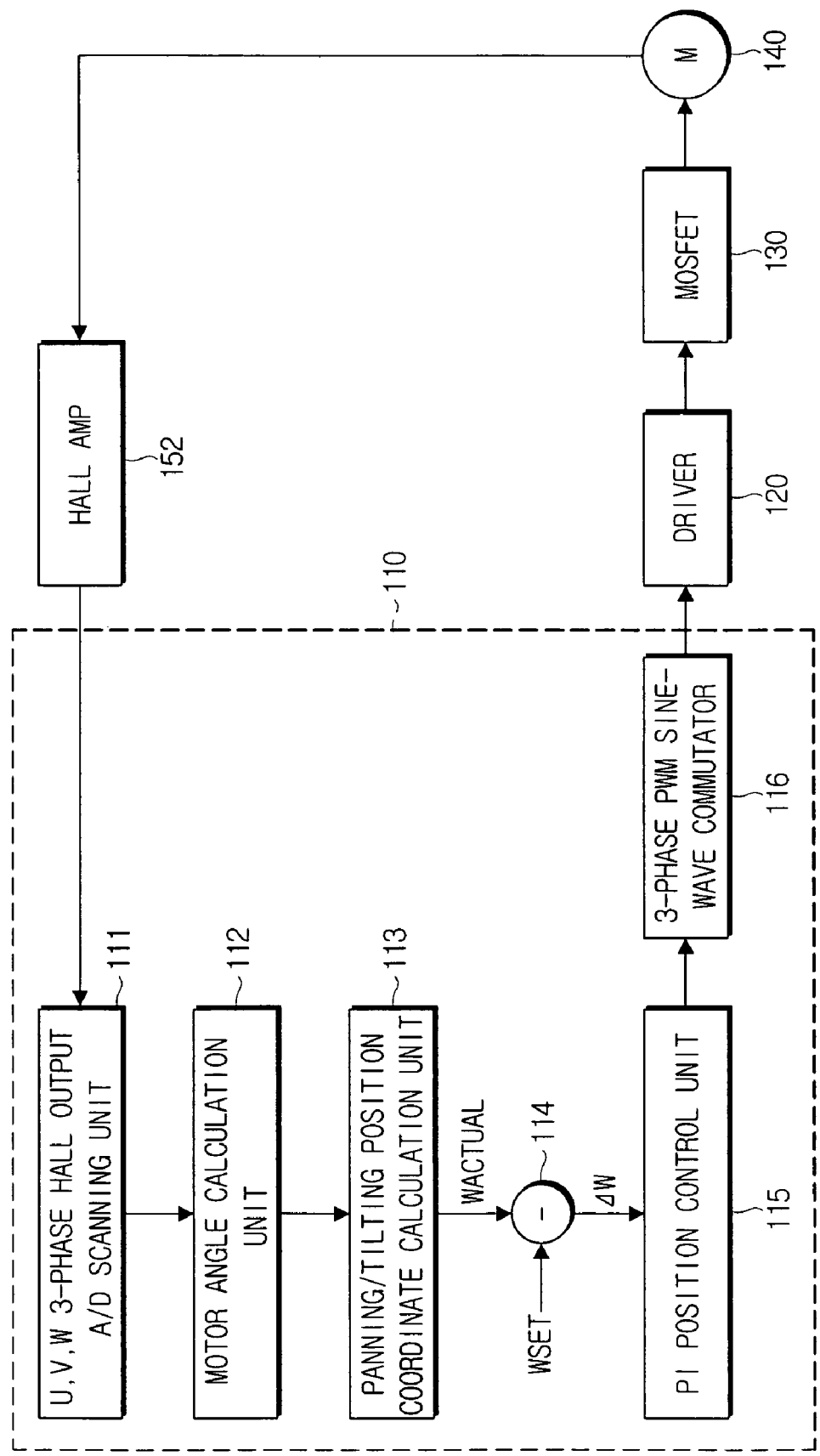
FIG. 4 is a block diagram illustrating a softwired position control module based on an output voltage of a hall sensor of a motor according to an exemplary embodiment of the present invention.

A position control method using the output voltage from the hall sensors 140a-140c and 142a-142c of the motors 140 and 142 using the above construction and according to an exemplary embodiment of the present invention will now be described with reference to FIG. 4. For illustrative purposes, the method will be described with reference to the panning motor 140. It is to be understood that the method can also be implemented by the tilting motor 142.

First, voltages U, V and W are outputted respectively from the 3-phase hall sensors 140a-140c of the motor 140 are amplitude-modulated by the hall amplifier 150, which outputs them to the control unit 110, as shown in FIG. 3. As shown in FIG. 4; an A/D scanning unit 111 in the control unit 110 performs A/D-scanning of analog data provided to it. A motor angle calculation unit 112 calculates an angle of the motor using input data U, V and W from the A/D scanning unit 111.

A panning/tilting position coordinate calculation unit 113 calculates the present coordinate Wactual indicative of an actual position of the panning/tilting camera based on the angle of the motor calculated by the motor angle calculation unit 112.

A comparator 114 compares the actual panning/tilting position Wactual with a target panning/tilting position Wset and, if the actual panning/tilting position Wactual does not coincide with the target panning/tilting position Wset, a proportional integral (PI) position control unit 115 transmits six PWM signals to the driver 120 from a 3-phase PWM sine-wave commutator 116 to move the motor toward the target position.

A process of calculating the angle of the motor will now be described with reference to FIGS. 5 and 6 in accordance with an exemplary embodiment of the present invention.

Figure 5:
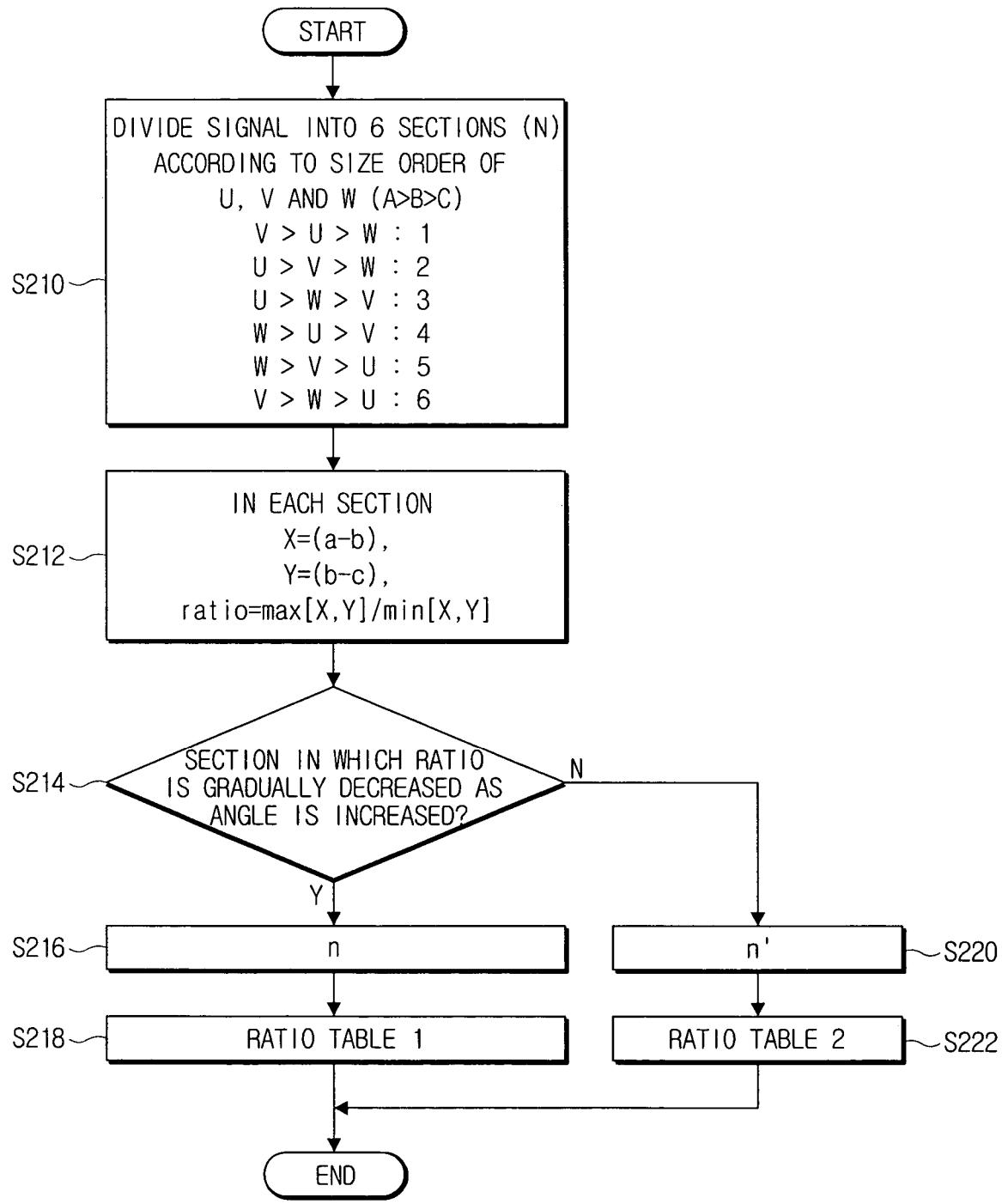
FIG. 5 is a flowchart illustrating a sequence of operations for preparing a reference table to calculate an angle of a motor according to an exemplary embodiment of the present invention.
Figure 6:
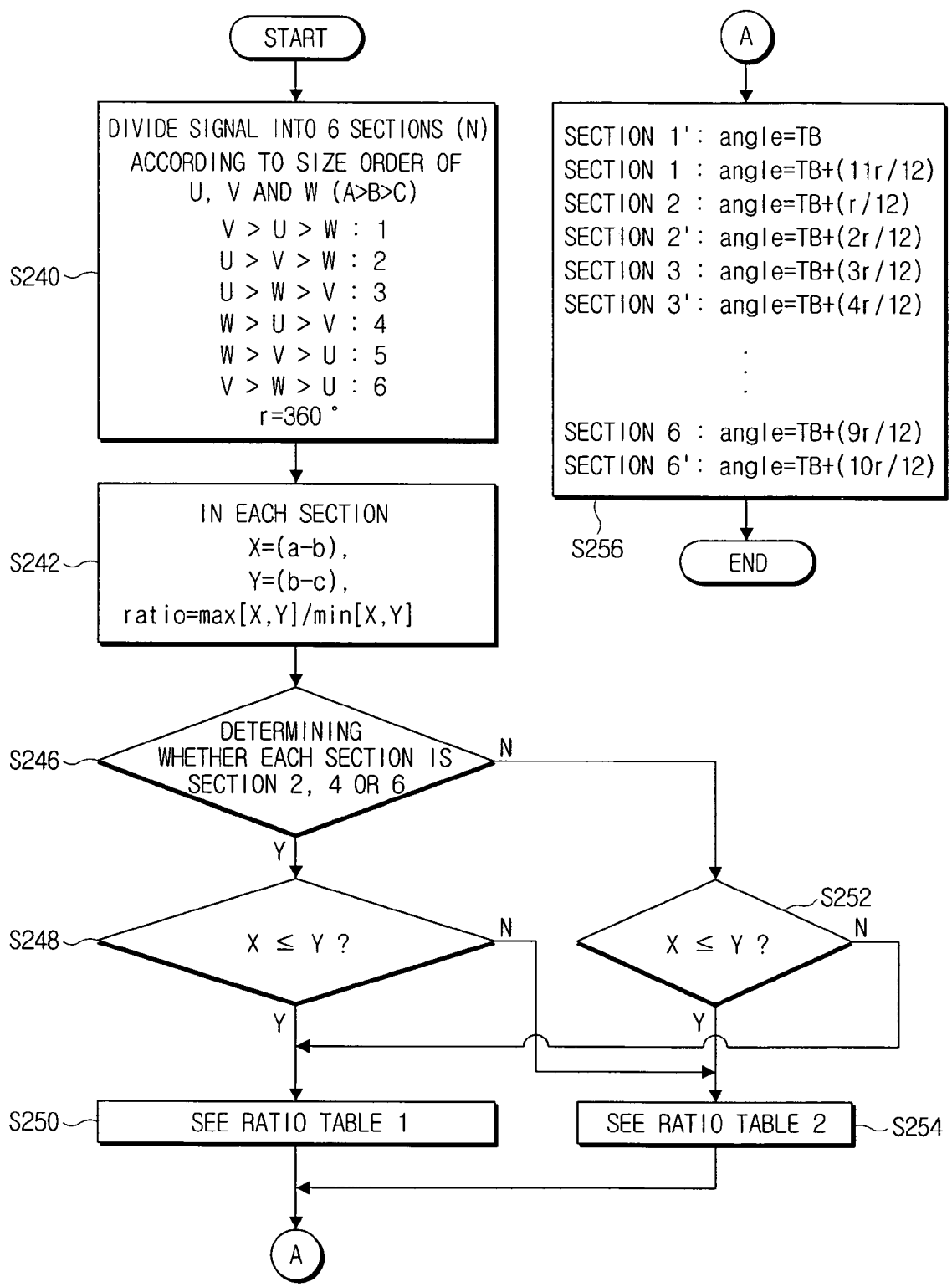
FIG. 6 is a flowchart illustrating a sequence of operations for calculating an angle of a motor with reference to a reference table according to an exemplary embodiment of the present invention.

FIG. 5 is a flowchart explaining a process of preparing a reference table to calculate the angle of the motor, and FIG. 6 is a flowchart explaining a process of calculating the angle of the motor with reference to a reference table according to an exemplary embodiment of the present invention.

When the panning motor 140 rotates, 3-phase output voltages U, V and W of the hall sensors 140a-140c in the motor 140 are provided to the hall amplifier 150 which regulates the voltage and amplitude. The hall amplifier 150 modulates the amplitude and offset of the 3-phase voltages to output them to the control unit 110. The control unit 110 receives the output waveform at an A/D port therein (not shown), and scans it for a specified period of time (e.g., via the A/D scanning unit 111) so that the motor angle calculation unit 112 calculates the actual angle of the motor 140 for each scanning operation. Specifically, the angle of the motor 140 is calculated based on the size and ratio of a 3-phase sine wave having the phase difference of 120 degrees.

Figure 8:
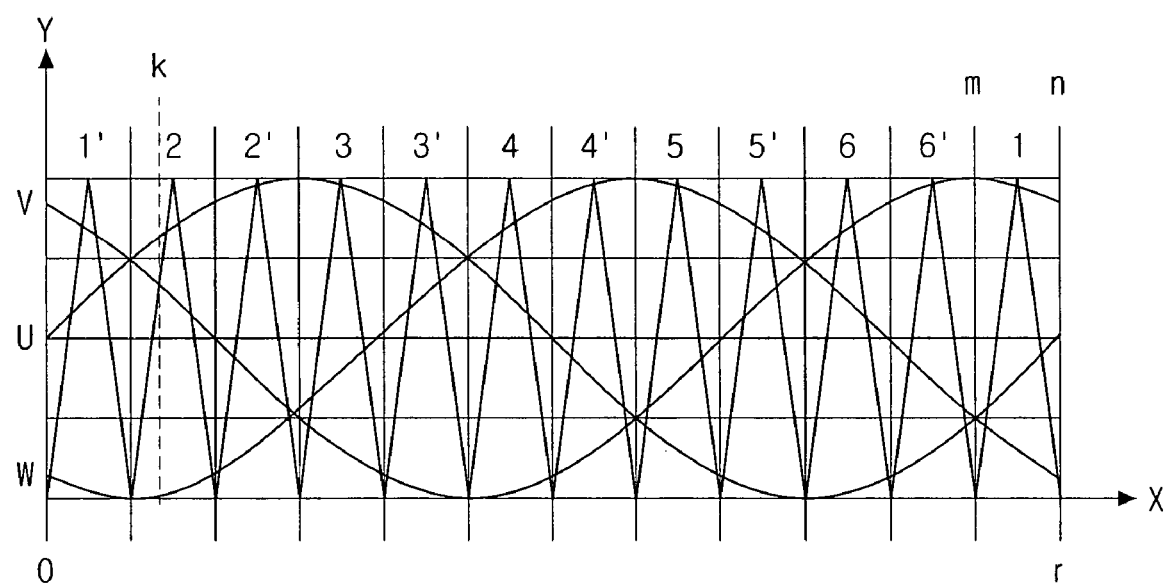
FIG. 8 is a waveform view of an output voltage of a hall sensor according to motor rotation according to an exemplary embodiment of the present invention.

In order to calculate the angle of the motor 140 in accordance with an exemplary embodiment of the present invention, the waveforms U, V and W outputted from the hall amplifier 150 are characterized using 6 sections according to size order thereof (step S210), as shown in FIGS. 5 and 8.

Specifically, as shown in step S210 of FIG. 5, a section of the waveforms in which it is determined that V>U>W is designated as 1, a section of the waveforms in which U>V>W is designated as 2, a section of the waveforms in which U>W>V is designated as 3, a section of the waveforms in which W>U>V is designated as 4, a section of the waveforms in which W>V>U is designated as 5, and a section of the waveforms in which V>W>U is designated as 6. In addition, a maximum value of the U, V and W is designated as "a," an intermediate value of the U, V and W is designated as "b," and a minimum value of the U, V and W is designated as "c." (see FIG. 8).

Twelve sections are respectively shown as 1', 2. 2', 3, 3', 4, 4', 5, 5', 6, 6', and 1 in FIG. 8.

With continued reference to FIG. 5, $X=(a-b)$ and $Y=(b-c)$ are calculated in each of the six divided sections, and a ratio of a small value to a large value in X and Y values (ratio=max[X, Y]/min[X,Y]) is calculated (step S212).

Then, when the angle is increased, the section is again divided into two parts, i.e., n and n' by two, according to whether the ratio is increased or decreased. Specifically, it is determined whether the ratio is decreased according to the increased angle (step S214). If the ratio is decreased, the section is n (step S216). If the ratio is increased, the section is divided by two, n' (step S220). That is, in the six sections, the section where the ratio is decreased is characterized as one of 1, 2, 3, 4, 5, and 6, while the section where the ratio is increased is characterized as one of 1', 2', 3', 4', 5', and 6' (see FIG. 8).

For example, in the section m in FIG. 8, the ratio is infinite. Referring to FIG. 8, a=4, b=1, and c=1 (when y-coordinate is set as 0). Hence, since X=3 and Y=0, the ratio is infinite. Using the exemplary method described above, since ratio=1 in the section n, the ratio is decreased in the sections m and n, and thus a value n is 1.

Ratio tables RATIO TABLE 1 and RATIO TABLE 2 are prepared according to decreased or increased ratio to complete a reference table (steps S218 and S222). Specifically, the ratio values in the respective areas 1, 1', 2. 2', 3, 3', 4, 4', 5, 5', 6, and 6' are calculated to create the table in which, if the section is n. Table 1 is created. Further, if the section is n', Table 2 is created (see FIG. 8).

More specifically, Table 1 refers to values {∞, . . . , 1} which are continuously decreased, while Table 2 refers to values {1, . . . , ∞} which are continuously increased.

Although one section is divided by 30 degrees, the table may be prepared in a large size so as to improve the angle resolution.

If the reference table is prepared as described above, the motor angle calculation unit 112 calculates the actual angle of the motor via the following process.

Referring to FIG. 6, X, Y and above-described ratio are calculated through the same process as that shown in FIG. 5 (steps S240 and 242), and it is determined whether the sections are 2, 4, and 6 (step S246). The reason why the section is determined in step S246 will now be described. When the ratio table is prepared, the table is prepared according to whether the ratio is increased or decreased in the section. When the table is to be referred to, since only values U, V and W are known in one point, it is not possible to determine whether n or n' is referred to in the table. In addition, referring to the graph of the sections 1, 3 and 5 and sections 2, 4 and 6 in FIG. 8, in the sections 1, 3 and 5, when X≧Y, n is referred to, and when X<Y, n' is referred to. In the sections 2, 4 and 6, when X≦Y, n is referred to, and when X>Y, n' is referred to. Hence, in order to determine whether n or n' is referred to in the table using the value of one point only, it is necessary to characterized the section as one of the sections 1, 3 and 5, or the sections 2, 4 and 6.

If n corresponds to one of the sections 2, 4 and 6, it is determined whether the value X is below the value Y (step S248). If the value X is below the value Y, a table address TB having the most approximate value to the ratio value is calculated using ratio table 1 (step S250). At this time, it is preferable that the approximate value is sequentially compared with elements in the table one by one to find the most approximate value. Further, if the value X is above the value Y, a table address (TB) having the most approximate value to the ratio value is calculated using ratio table 2 (step S254). Similarly, if n corresponds to one of the sections 1, 3 and 6, it is determined whether the value X is below the value Y (step S252). If the value X is below the value Y, a table address TB having the most approximate value to the ratio value is calculated using ratio table 2 (step S254). If the value X is above the value Y, a table address TB having the most approximate value to the ratio value is calculated using ratio table 1 (step S250).

By adding the respective offset values to the TB value, the electronic angle of the motor is calculated (step S256).

The offset value for each section is set to be increased by 30 degrees, as step S256 indicates.

Explaining the process in detail based on a point k in FIG. 8 for illustrative purposes, since U=3.5, V=2.5 and W=0.1 at the point k (i.e., U>V>W), the section is characterized as section 2. Hence, since the section is 2 in step S246, and X<Y (X=1, and Y=2.4) in step S248, an address having an approximate value is found with reference to the ratio table 1. That is, since ratio=2.4, it finds the most approximate value to the ratio table 1. For example, if the most approximate value to 2.4 is in the 15$^{th}$ section of the table, the electronic angle of the motor corresponding to the section 2 is calculated with reference to a formula to obtain the interested angle in step S256. Since the angle of the motor is TB+(2r/12) in the section 2, i.e., 15+(360 degrees/12), the actual angle of the motor is 45 degrees.

If the angle of the motor is calculated in the motor angle calculation unit 112, the panning/tilting position coordinate calculation unit, 113 calculates the position coordinate Wactual indicative of the actual position of the panning/tilting camera based on the angle of the motor.

Figure 7:
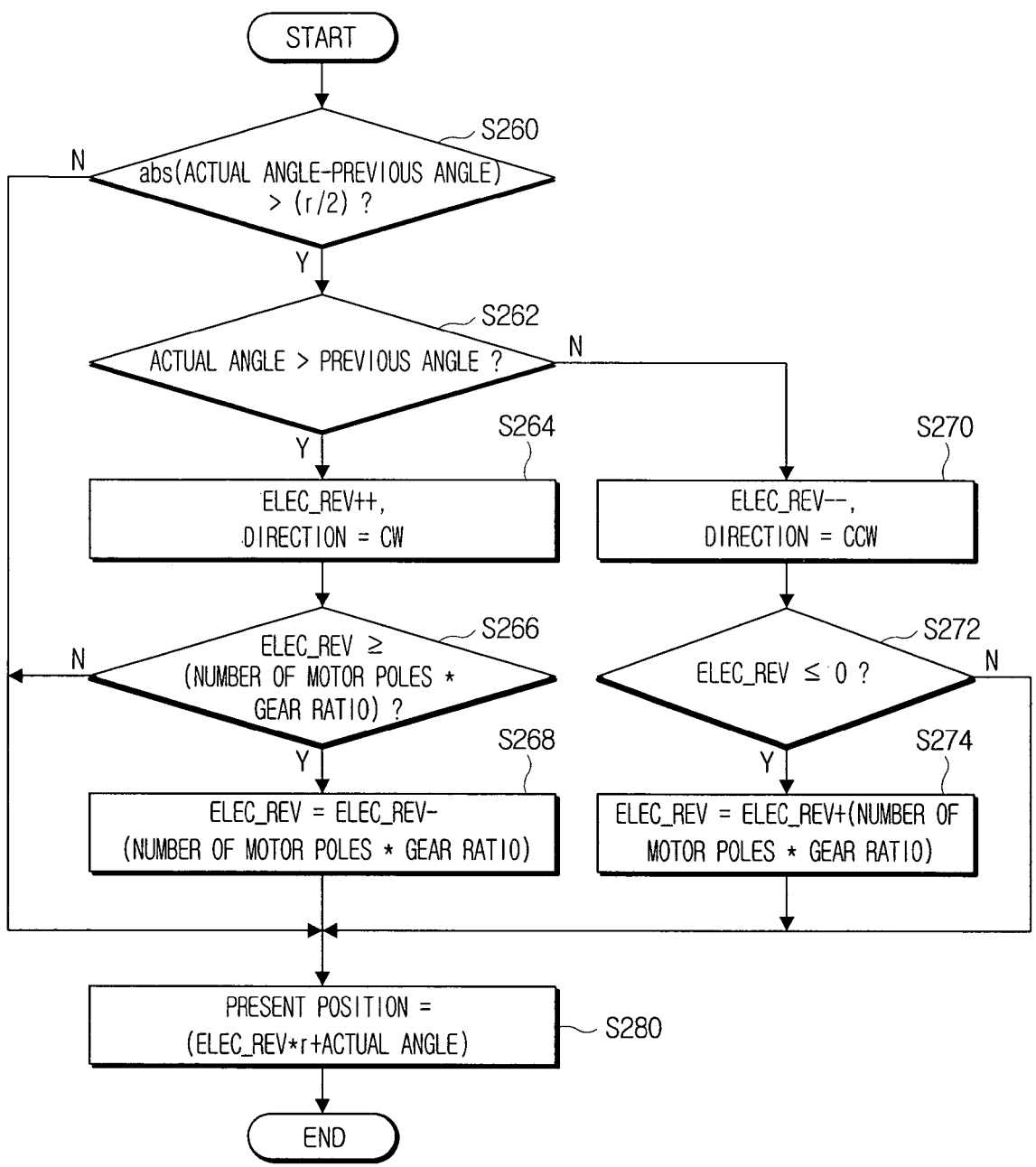
FIG. 7 is a flowchart illustrating a sequence of operations for calculating an actual position coordinate of a panning motor based on an electronic angle of a motor according to an exemplary embodiment of the present invention.

A process of calculating the actual position coordinate of the panning motor based on the electronic angle of the motor will now be described with reference to FIG. 7.

First, it is determined whether an absolute value of the difference between the actual angle and the previous angle of the motor is larger than a specified value (r/2) (step S260). If the absolute value is larger than the specified value, it is determined that it corresponds to one electronic rotation, and the size of the actual angle is compared with that of the previous angle (steps S262) for the panning direction to be determined. If the actual angle is larger than the previous angle in step S262, the direction of the motor is determined as clockwise CW, and the electronic revolution of the panning motor COUNTER(elec_rev) is increased by 1 (step S264).

It is then determined whether the value of the increased electronic revolution COUNTER(elec_rev) is larger than a value which is obtained by multiplying the number of poles of the motor by a gear ratio (step S266).

If the value of the increased electronic revolution COUNTER(elec_rev) is larger than a value which is obtained by multiplying the number of poles of the motor by the gear ratio in step S266, the value of the increased electronic revolution COUNTER(elec_rev) is calculated as follows (step S268).

elec_rev=elec_rev−(the number of poles of the motor*gear ratio)

Also, if the actual angle is not larger than the previous angle in step S262, the direction of the motor is determined as counterclockwise CCW, and the electronic revolution of the panning motor COUNTER(elec_rev) is decreased by 1 (step S270).

When the decreased value of elec_rev is smaller than 0 in the above step (step S272), the value of the electronic revolution of the panning motor COUNTER(elec_rev) is calculated as follows (step S274).

elec_rev=elec_rev+(the number of poles of the motor*gear ratio)

If the value of the electronic revolution of the panning motor COUNTER(elec_rev) to is not larger than the value which is obtained by multiplying the number of poles of the motor by the gear ratio in step S266, or the value of elec_rev is larger than 0, the actual position of the panning motor is calculated in step S280, with the previous value of elec_rev being maintained.

That is, the actual position of the panning motor is calculated as follows.

actual position=(elec_rev*r+actual angle of motor)

For example, if elec_rev is 12 and the actual angle of the motor is 45 degrees, the actual position of the panning motor is 12*360 degrees+45 degree.

Thus, the PI position control unit 115 calculates the difference ΔW between the target position coordinate Wset of the panning motor and the actual position coordinate Wactual calculated by the above process and, if the target position coordinate Wset of the panning motor is different from the actual position coordinate Wactual, the panning motor is controlled so that it moves as far as the difference to reach the target panning position.

As described above, the present invention can execute accurately the closed loop control of the panning/tilting motor without employing a position detection device such as encoder.

With the above construction, according to the present method of controlling the panning/tilting motor of the monitoring camera, in which the camera can be panned and/or, tilted, the closed loop control of the panning and/tilting motor can be accurately executed, without the position detection device, such as encoder. In addition, even though the panning and/tilting motor does not rotate by software, since the voltage output of the hall sensor is always A/D-scanned for a specified period, the position coordinate of the panning/tilting motor is not distorted when the motor is out of step.

Furthermore, when the encoder is used, the accuracy of the position control is physically limited by the resolution of the encoder. However, since the accuracy of the position control is determined by the A/D scan resolution that can be varied by software and the operation speed, according to the present invention, the resolution may be varied.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An apparatus for controlling a panning/tilting motor of a monitoring camera, comprising a control unit for controlling a position or speed of the panning/tilting motor using an output of a hall sensor provided in the motor, the control unit comprising
a motor angle calculation unit for calculating an actual angle of the motor based on data outputted from the hall sensor; and
a panning/tilting position coordinate calculation unit for calculating an actual position of the panning/tilting motor based on the angle of the motor calculated by the motor angle calculation unit;
wherein the actual position of the panning/tilting motor is calculated as follows:
actual position=(elec_rev*360 degrees+actual angle of motor); and
wherein the elec_rev represents a value of electronic rotation of the motor COUNTER.

2. The apparatus as claimed in claim 1, wherein the motor comprises multiple hall sensors, and further comprising a hall amplifier having an analog-to-digital (A/D) port to amplify 3-phase output voltages received from the hall sensors, and wherein the motor angle calculation unit receives an output waveform of the hall amplifier which modulates 3-phase output voltages of respective motor hall sensors of the panning/tilting motor with the same amplitude and offset through its A/D port when the panning/tilting motor rotates, and the motor angle calculation unit scans the voltages for a specified period of time to calculate the actual angle of the motor for each scanning operation.

3. The apparatus as claimed in claim 1, wherein the electronic revolution of the motor COUNTER(elec_rev) is calculated such that, if the actual angle is larger than the previous angle, the direction of the motor is determined as clockwise, and the electronic revolution of the panning/tilting motor COUNTER(elec_rev) is increased by 1, while if a value of the increased electronic revolution COUNTER(elec_rev) is larger than a value which is obtained by multiplying the number of poles of the motor by a gear ratio, the value of the increased electronic revolution COUNTER(elec_rev) is substituted by elec_rev =elec_rev−(the number of poles of the motor*gear ratio).

4. The apparatus as claimed in claim 1, wherein the electronic revolution of the motor COUNTER(elec_rev) is calculated such that, if the actual angle is smaller than the previous angle, the direction of the motor is determined as counterclockwise, and the electronic revolution of the panning/tilting motor COUNTER(elec_rev) is decreased by 1, while if a value of the decreased electronic revolution COUNTER (elec_rev) is smaller than 0, the value of the electronic revolution COUNTER(elec_rev) is substituted by elec_rev= elec_rev+(the number of poles of the motor*gear ratio).

5. The apparatus as claimed in claim 1, further comprising a proportional integral (PI) position control unit for controlling position or speed so that a predetermined target position coordinate of the panning/tilting motor is compared with the actual position coordinate of the panning/tilting motor calculated by the position coordinate calculation unit and, if the target position coordinate of the of the panning/tilting motor is different from the actual position coordinate, the panning/tilting motor moves as far as the difference to reach the target position.

6. An apparatus for controlling a panning/tilting motor of a monitoring camera, comprising:
a brushless direct current (BLDC) motor having a hall sensor;
a control unit;
a hall amplifier for modulating an output voltage of the hall sensor into a value that can be calculated in the control unit by amplitude-modulating the output voltage of the hall sensor with the same amplitude and offset, the control unit outputting a PWM pulse to drive the BLDC motor and receiving the voltage of the hall sensor outputted from the hall amplifier to control a position or speed of the panning/tilting motor; and
a 3-phase motor driver for modulating the PWM pulse from the control unit to apply 3-phase sine-wave current to the BLDC motor;
wherein the position or speed of the panning/tilting motor is controlled by only the output of the hall sensor provided in the motor;
wherein the control unit comprises a motor angle calculation for calculating an actual angle of the motor based on data outputted from the hall sensor; and
a panning/tilting position coordinate calculation unit for calculating an actual position of the panning/tilting motor based on the angle of the motor calculated by the motor angle calculation unit; and
the actual position of the panning/tilting motor is calculated as follows:
actual position=(elec_rev*360 degrees+actual angle of motor); and
wherein the elec_rev represents a value of electronic revolution of the motor COUNTER.

7. The apparatus as claimed in claim 6, wherein the motor angle calculation unit receives an output waveform from the hall amplifier at an A/D port, and scans the voltage for a specified period of time, so that the motor angle calculation unit calculates the actual angle of the motor for each scanning operation.

8. The apparatus as claimed in claim 6, wherein the electronic revolution of the motor COUNTER(elec_rev) is calculated such that, if the actual angle is larger than the previous angle, the direction of the motor is determined as clockwise, and the electronic revolution of the panning/tilting motor COUNTER(elec_rev) is increased by 1, while if a value of the increased electronic revolution COUNTER(elec_rev) is larger than a value which is obtained by multiplying the number of poles of the motor by a gear ratio, the value of the increased electronic revolution COUNTER(elec_rev) is substituted by elec_rev =elec_rev−(the number of poles of the motor*gear ratio).

9. The apparatus as claimed in claim 6, wherein the electronic revolution of the motor COUNTER(elec_rev) is calculated such that if the actual angle is smaller than the previous angle, the direction of the motor is determined as counter-clockwise, and the electronic revolution of the panning/tilting motor COUNTER (elec_rev) is decreased by 1, while if a value of the decreased electronic revolution COUNTER (elec_rev) is smaller than 0, the value of the electronic revolution COUNTER(elec_rev) is substituted by elec_rev= elec_rev+(the number of poles of the motor*gear ratio).

10. The apparatus as claimed in claim 6, wherein the control unit comprises a PI position control unit for controlling the position or speed so that a predetermined target position coordinate of the panning/tilting motor is compared with the actual position coordinate of the panning/tilting motor calculated by the position coordinate calculation unit and, if the target position coordinate of the of the panning/tilting motor is different from the actual position coordinate, the panning/tilting motor moves as far as the difference to reach the target position.

11. A method for controlling a panning/tilting motor of a monitoring camera, comprising the steps of:
(1) calculating an actual angle of the motor based on an output of a hall sensor provided in the motor:
(2) calculating an actual position of the panning/tilting motor based on the actual angle of the motor calculated in the angle calculation step (1); and
(3) calculating a difference between a predetermined target position coordinate of the panning/tilting motor and the actual position coordinate of the panning/tilting motor by comparing the coordinates with each other and, if the target position coordinate of the panning/tilting motor is different from the actual position coordinate, controlling the position or speed of the panning/tilting motor so that the motor moves as far as the difference to reach the target position;
wherein the actual position of the panning/tilting motor is calculated as follows:
actual position=(elec_rev*360 degrees+actual angle of motor);
wherein the elec_rev represents a value of electronic rotation of the motor COUNTER.

12. The method as claimed in claim 11, wherein the electronic revolution of the motor COUNTER(elec_rev) is calculated such that if the actual angle is larger than the previous angle, the direction of the motor is determined as clockwise, and the electronic revolution of the panning/tilting motor COUNTER(elec_rev) is increased by 1, while if a value of the increased electronic revolution COUNTER(elec_rev) is larger than a value which is obtained by multiplying the number of poles of the motor by a gear ratio, the value of the increased electronic revolution COUNTER(elec_rev) is substituted by elec_rev=elec_rev−(the number of poles of the motor*gear ratio).

13. The method as claimed in claim 11, wherein the electronic revolution of the motor COUNTER(elec_rev) is calculated such that if the actual angle is smaller than the previous angle, the direction of the motor is determined as counter-clockwise, and the electronic revolution of the panning/tilting motor COUNTER(elec_rev) is decreased by 1, while if a value of the decreased electronic revolution COUNTER (elec_rev) is smaller than 0, the value of the electronic revolution COUNTER(elec_rev) is substituted by elec_rev=elec_rev+(the number of poles of the motor*gear ratio).

14. The method as claimed in claim 11, wherein the step (1) of calculating the actual angle of the motor comprises the steps of:
amplitude-modulating an output voltage of the hall sensor built in the motor with predetermined and substantially the same amplitude and offset; and
receiving the amplitude-modulated 3-phase signal as a digital signal, scanning the signal for a specified period of time and calculating the actual angle of the motor for each scanning operation.

15. The method as claimed in claim 14, wherein the step of calculating the actual angle of the motor comprises the steps of:
receiving amplitude modulated 3-phase signal as a digital signal and dividing the signal into a desired number of sections represented by at least sections 1, 2, 3, 4, 5 and 6 according to a size order (a>b>c) of a value scanned for a specified period of time where a, b and c represent respective phases of the 3-phase signal;
calculating X=(a−b), Y=(b−c) and ratio max[X, Y]/min[X, Y]) based on a maximum value (a), an intermediate value (b), and a minimum value (c) in each section;
determining whether an angle of the motor is increased or decreased;
if the angle is decreased, calculating a ratio value for each section of which the angle is decreased in the section (n), and preparing a first table based on the ratio value for each section, while if the angle is increased, calculating a ratio value for each section of which the angle is increased in the section (n), and preparing a second table based on the ratio value for each section;
determining whether each section is a section 2, 4 or 6; and
if each section is the section 2, 4 or 6 in the step of determining the section, determining whether the value X is smaller than the value Y, and if the value X is smaller than the value Y, adding each offset value to a value of a table address having a most approximate value to the ratio value with reference to the first table to calculate an electronic angle of the motor.

16. The method as claimed in claim 15, further comprising the step of, if each section is the section 2, 4 or 6 in the step of determining the section and if the value X is larger than the value Y, adding each offset value to a value of a table address having a most approximate value to the ratio value with reference to the second table to calculate the electronic angle of the motor.

17. The method as claimed in claim 16, further comprising the step of, if each section is not the section 2, 4 or 6 in the step of determining the section and if the value X is smaller than the value Y, adding each offset value to a value of a table address having a most approximate value to the ratio value with reference to the second table to calculate the electronic angle of the motor.

18. The method as claimed in claim 15, further comprising the step of, if each section is not the section 2, 4 or 6 in the step of determining the section, determining whether the value X is smaller than the value Y, and if the value X is smaller than the value Y, adding each offset value to a value of a table address having a most approximate value to the ratio value with reference to the second table to calculate the electronic angle of the motor.

* * * * *